US008155801B2

(12) United States Patent
Chang et al.

(10) Patent No.: US 8,155,801 B2
(45) Date of Patent: Apr. 10, 2012

(54) ARCHITECTURE WITH OPTIMIZED INTERFACING FOR AN AIRCRAFT HYBRID COCKPIT CONTROL PANEL SYSTEM

(75) Inventors: Jie Jay Chang, Thousand Oaks, CA (US); Van Tatavoosian, Mission Viejo, CA (US)

(73) Assignee: Eaton Corporation, Cleveland, OH (US)

( * ) Notice: Subject to any disclaimer, the term of this patent is extended or adjusted under 35 U.S.C. 154(b) by 598 days.

(21) Appl. No.: 12/367,781

(22) Filed: Feb. 9, 2009

(65) Prior Publication Data

US 2010/0204854 A1    Aug. 12, 2010

(51) Int. Cl.
*G06F 17/00* (2006.01)
*G06F 19/00* (2006.01)

(52) U.S. Cl. ........................................... 701/3

(58) Field of Classification Search ................... None
See application file for complete search history.

(56) References Cited

U.S. PATENT DOCUMENTS

| 4,501,937 | A  | * | 2/1985  | Anderson et al.  | 200/5 A |
| 6,812,858 | B2 | * | 11/2004 | Griffin, III     | 340/945 |
| 7,420,476 | B2 | * | 9/2008  | Stiffler         | 340/945 |
| 2005/0065669 | A1 | * | 3/2005 | Roux et al.      | 701/3   |

* cited by examiner

*Primary Examiner* — Michael J. Zanelli
(74) *Attorney, Agent, or Firm* — Kraguljac Law Gp., LLC

(57) ABSTRACT

A hybrid electronics cockpit control panel system architecture is provided that includes optimized interfacing and partitioning. The architecture includes a digital function block with a digital signal processor and digital communication capabilities. The architecture also includes integrated cockpit control panels that employ a printed circuit board to avoid wire/cable connections for cockpit control panel components beyond the face panel. The architecture provides digital control and communication along a central communication bus that can eliminate the need for dedicated wire connections between the control panel and the electrical components throughout the aircraft, reducing weight and volume. One example aircraft cockpit control panel system includes a control signal processor that receives electrical control signals from pilot operating devices on the control panel and transforms them into digital status signals for communication on a communication bus. In another example aircraft cockpit control panel system, the control signal processor transforms the electrical control signals into digital control signals that are communicated to aircraft components. In another example aircraft cockpit control panel system, signals from a first control signal processor are passed through at least a second control signal processor to provide a redundant circuit path.

20 Claims, 10 Drawing Sheets

ARCHITECTURE WITH OPTIMIZED INTERFACING FOR AN AIRCRAFT HYBRID COCKPIT CONTROL PANEL SYSTEM

BACKGROUND

Cockpit control panels include switches, voltage control reference devices, annunciating devices and other pilot operating devices that are manually operated and acted upon by the pilot to control remotely located aircraft components such as, for example, lighting systems, air conditioning, and landing gear. State of the art designs of today's conventional aircraft cockpit control panels (CCP) are based on discrete electrical components with fixed point-to point connection between the components by way of copper electrical wire. Each individual CCP uses multiple insulated electrical wires that can be more than fifteen to twenty feet in length to control various electrical loads by discrete electrical control signals.

The number of wires that are required for this point-to-point connection between the CCP and electrical loads adds significant weight to the aircraft and occupy precious space in the cockpit and aircraft. Because of the dedicated nature of the connections between the pilot operating devices on the CCP and the electrical loads they control, control commands must be set individually for each electrical load. The conventional CCP cannot effectively communicate data with the aircrafts' flight computer or other on-board computers associated with various load systems. In addition, the conventional CCP cannot effectively collect, process and intelligently display data from different sources of electric load systems. Finally, the technique of hardwiring pilot operating devices to the aircraft components they control does not enable the pilot operating devices and the aircraft components to communicate with each other on more than a most basic level.

SUMMARY

One example embodiment of an aircraft hybrid cockpit control panel architecture includes a digital signal processing block that receives electrical control variable signals from pilot operating devices on the aircraft cockpit control panel and transforms them into operating status signals for communication on a communication bus. In another example embodiment aircraft hybrid cockpit control panel architecture, the digital signal processing block transforms the electrical control variable signals into digital aircraft component control signals that are communicated to aircraft components on the communication bus. In yet another example embodiment of an aircraft hybrid cockpit control panel architecture, signals from a first digital signal processing block are passed through at least a second digital signal processing block to provide a redundant circuit path.

A method that processes signals from an aircraft cockpit control panel receives an electrical control variable signal indicative of a control variable setting for the aircraft component from a pilot operating device. The electrical control variable signal is transformed into a digital operating status signal that is transmitted to an aircraft control device. In some embodiments the electrical control variable signal is transformed into a digital aircraft component control signal that is transmitted to the aircraft component.

In one example embodiment, an architecture for a hybrid electronics cockpit control panel (CCP) system is provided that features optimized interfacing. The system includes a digital signal processing block that includes a digital signal processor (DSP) and digital communication capabilities. The digital signal processing block is interfaced with an integrated cockpit control panel that includes a printed circuit board, such as, for example, a SlimLine™ cockpit control panel manufactured by Eaton Corporation. The use of the integrated cockpit control panels avoids the need for individual wire/cable connections for individual CCP components beyond the face panel. The digital signal processing block of the hybrid electronics cockpit control panel system enables enhanced digital control of electrical loads throughout the aircraft as well as improved communication with the electric loads and the flight and on-board computers. Multiple CCP electrical control signals may be carried by a central communication bus and in many circumstances the need for point-to-point connections between the CCP and electrical loads is eliminated, reducing weight and size. In addition the digital function block enables storage of command sequences that can be automatically executed by actuation of a single pilot operating device to perform a desired auto-sequence of control functions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
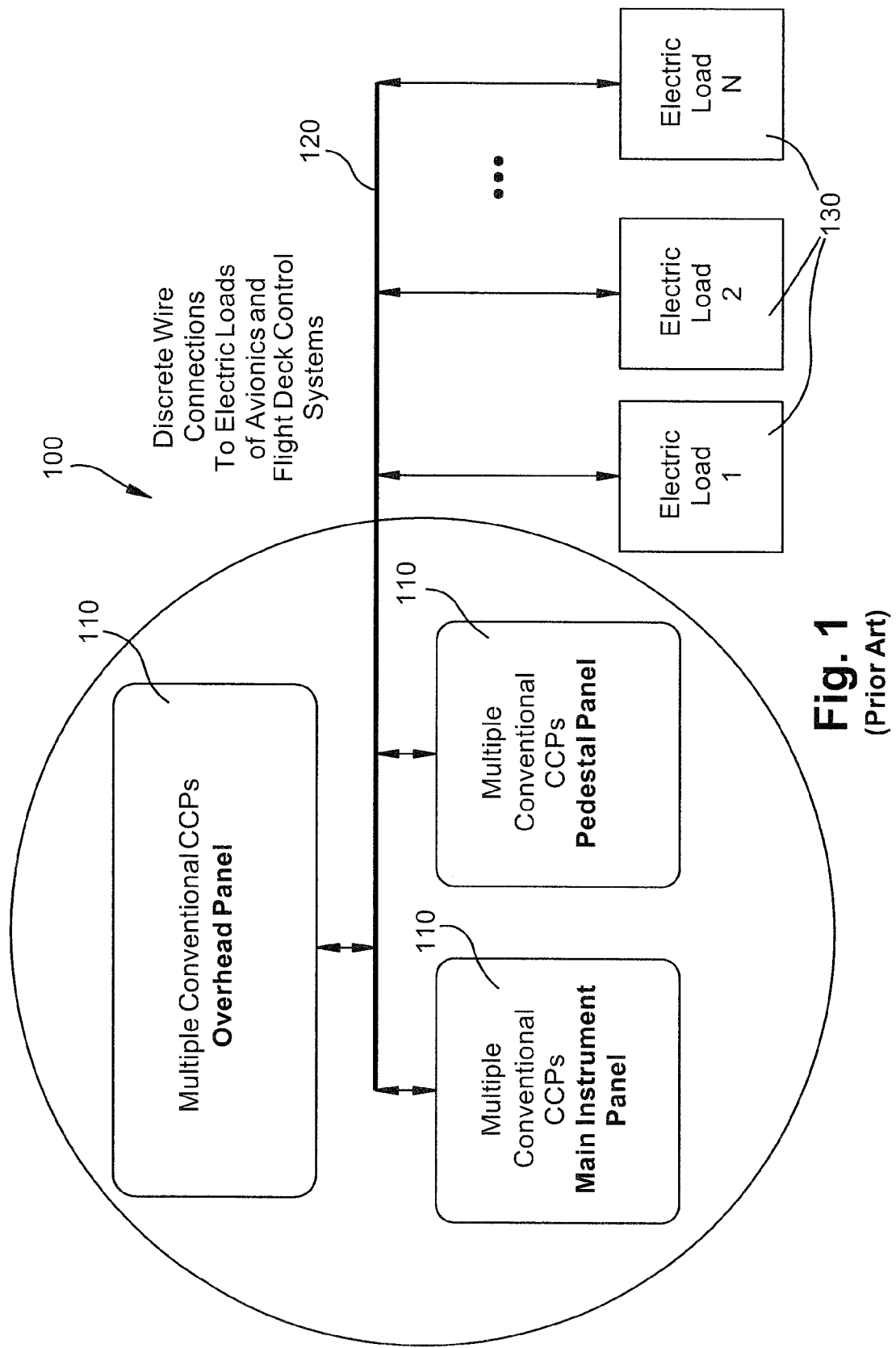
FIG. 1 illustrates a prior art system architecture of a conventional cockpit control panel and control cable configuration.

Digital signal processing capability is provided to aircraft cockpit control panels that typically have served simply as a connection point for a pilot operating device and a wire bundle that traversed the aircraft to the aircraft component controlled by the pilot operating device. This signal processing capability is accomplished by including a digital signal processing block associated with the control panel that receives signals from the pilot operating device, processes the signals, and transmits the processed signals to the various aircraft control devices and aircraft components. Aircraft control devices can include, but are not limited to avionics, flight deck control computers, electrical power systems, and load subsystems such as lighting and fire control. The processed signals include status signals that can be provided to the aircraft control device. The processed signals may also include digital control signals that are provided to the various aircraft load components.

Each digital signal processing block is configured to transmit signals on a communication bus that is routed between the aircraft cockpit control panels and the avionics and load computers and/or the aircraft components. The use of a communication bus in place of point to point wires provides weight and cost savings. In addition, the digital signal processing block enhances the performance of the aircraft cockpit control panel by enabling the control panel to communicate and receive more detailed information about the pilot operating device and the aircraft component it controls. The resulting hybrid aircraft cockpit control panel can thus communicate information from the aircraft component to an operator of the aircraft. In this manner, the hybrid aircraft cockpit control panel allows the operator to benefit from the increasing on-board signal processing capability of modern aircraft components.

The hybrid aircraft cockpit control panel with digital signal processing is capable of storing a set or series of instructions that can be executed to sequentially control various aircraft components upon actuation of a single pilot operating device. This capability can simplify the initial start process and pre-flight operation of the aircraft.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Signal", as used herein, includes but is not limited to, electrical signals, optical signals, analog signals, digital signals, data, computer instructions, processor instructions, messages, a bit, a bit stream, or other means that can be received, transmitted and/or detected.

Devices or components are described herein as being "in signal communication" with one another. "In signal communication" describes a relationship in which signals, physical communications, and/or logical communications may be sent and/or received. The signal communication may occur by way of a physical interface, an electrical interface, and/or a data interface. The signal communication may occur by way of differing combinations of interfaces and/or connections sufficient to allow communication between the devices or components. For example, two entities can be in signal communication when they are capable of communicating signals to each other directly or through one or more intermediate entities (e.g., processor, operating system, logic, software). Logical and/or physical communication channels can be used to place the devices or components in signal communication.

"Communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 illustrates a state of the art conventional aircraft cockpit control panel system 100. The system includes three main panel groups 110: an overhead panel group, a main instrument panel group and a pedestal panel group. Each conventional aircraft cockpit control panel includes one or more switches, voltage control reference devices, annunciating devices and other pilot operating devices that are operated by the pilot. Each panel also includes the wiring and/or cabling behind a face panel that connects the pilot operating devices to an output connector (not shown). The output connectors are connected to discrete wire connections 120 to various electric loads 130 and to avionics and flight deck control systems.

Figure 2A:
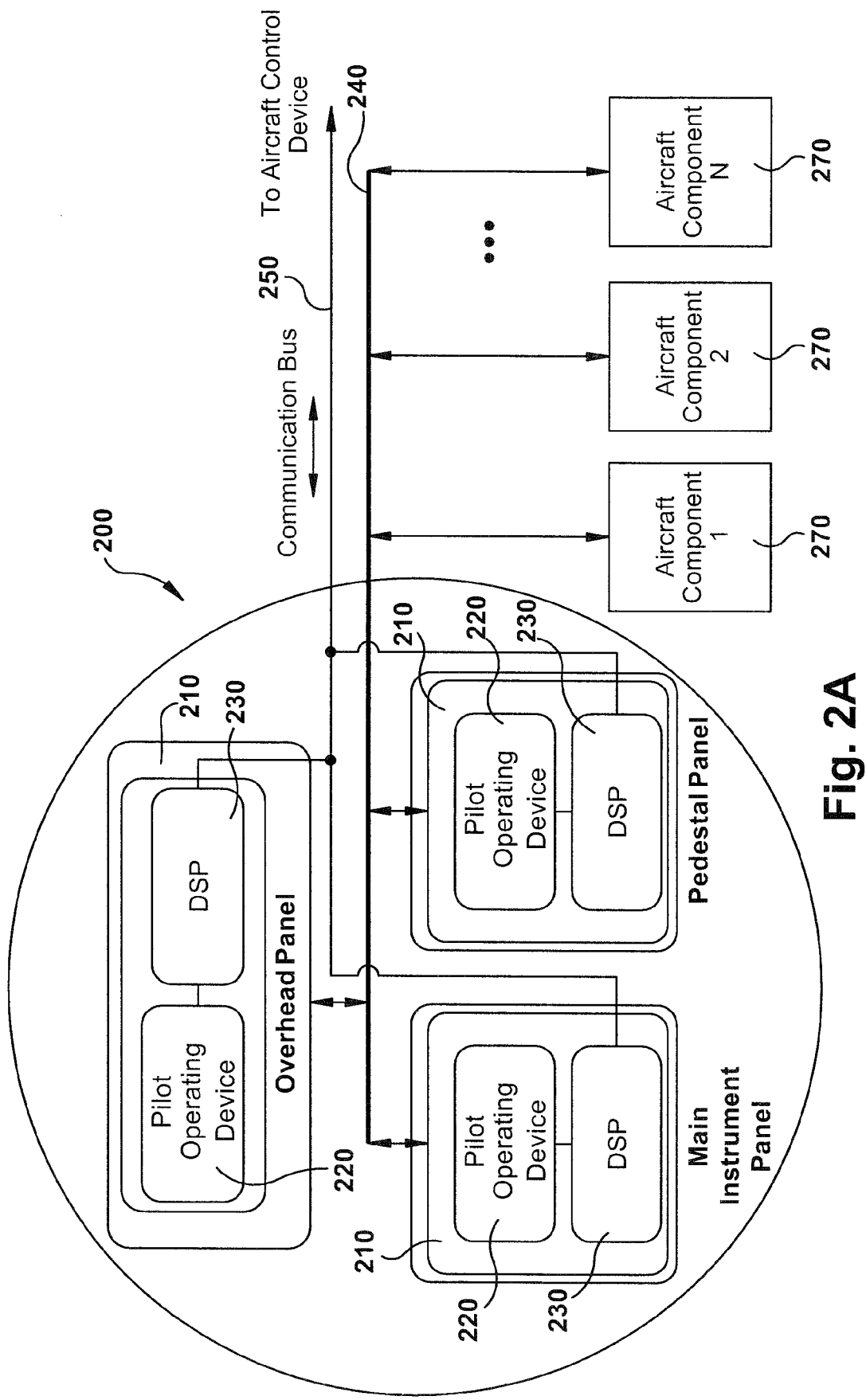
FIGS. 2A and 2B illustrate example embodiments of an aircraft hybrid cockpit control panel architecture where a digital signal processing block provides an auxiliary monitoring function.

Turning now to FIG. 2A, one example embodiment of a hybrid aircraft cockpit control panel system 200 is illustrated. The hybrid aircraft cockpit control panel system 200 includes three hybrid aircraft cockpit control panels 210: an overhead panel, a main instrument panel group, and a pedestal panel group. Each hybrid aircraft cockpit control panel group 210 houses at least one pilot operating device 220 and a digital signal processing block 230. The digital signal processing blocks 230 transform the electrical control variable signals from the pilot operating device into operating status signals indicative of a present status of the pilot operating device. To communicate the operating status signals, the hybrid aircraft cockpit control panels 210 are connected to a communication bus 250. A group of selected operating status signals are communicated on the communication bus 250 to one or more aircraft control devices (not shown), such as, for example, avionics and load control computers. In addition, the hybrid aircraft cockpit control panels 210 are connected to a bundle of wires 240 that are routed to the various aircraft components 270 controlled by the pilot operating devices on the aircraft cockpit control panels.

In the example embodiment shown in FIG. 2A, the digital signal processing blocks 230 act in an auxiliary monitoring role to collect and monitor electrical control variable signals set by the pilot operating devices on the panel bodies 220 in the overhead, main, and pedestal control panels 210 of the aircraft's cockpit area. The operating status of a selected group of the pilot operating devices is sent to the aircraft control devices on the serial communication bus 250. The control signals for the aircraft components 270 are transmitted on the wires in the wire bundle 250 to the aircraft components.

In addition to transmitting status signals to the aircraft control device, the digital signal processing blocks 230 receive flight status signals from the aircraft control device and/or aircraft component status signals from the aircraft components. These status signals can be processed by the digital signal processing blocks 230 and a corresponding status can be displayed on a status indicator, such as, for example, a light or text display on the aircraft hybrid cockpit control panel. Thus the example embodiment shown in FIG. 2A adds enhanced monitoring and communication capabilities to the hybrid aircraft control panel system while maintaining the use of hardwired connections to transmit control signals to the aircraft components.

Figure 2B:
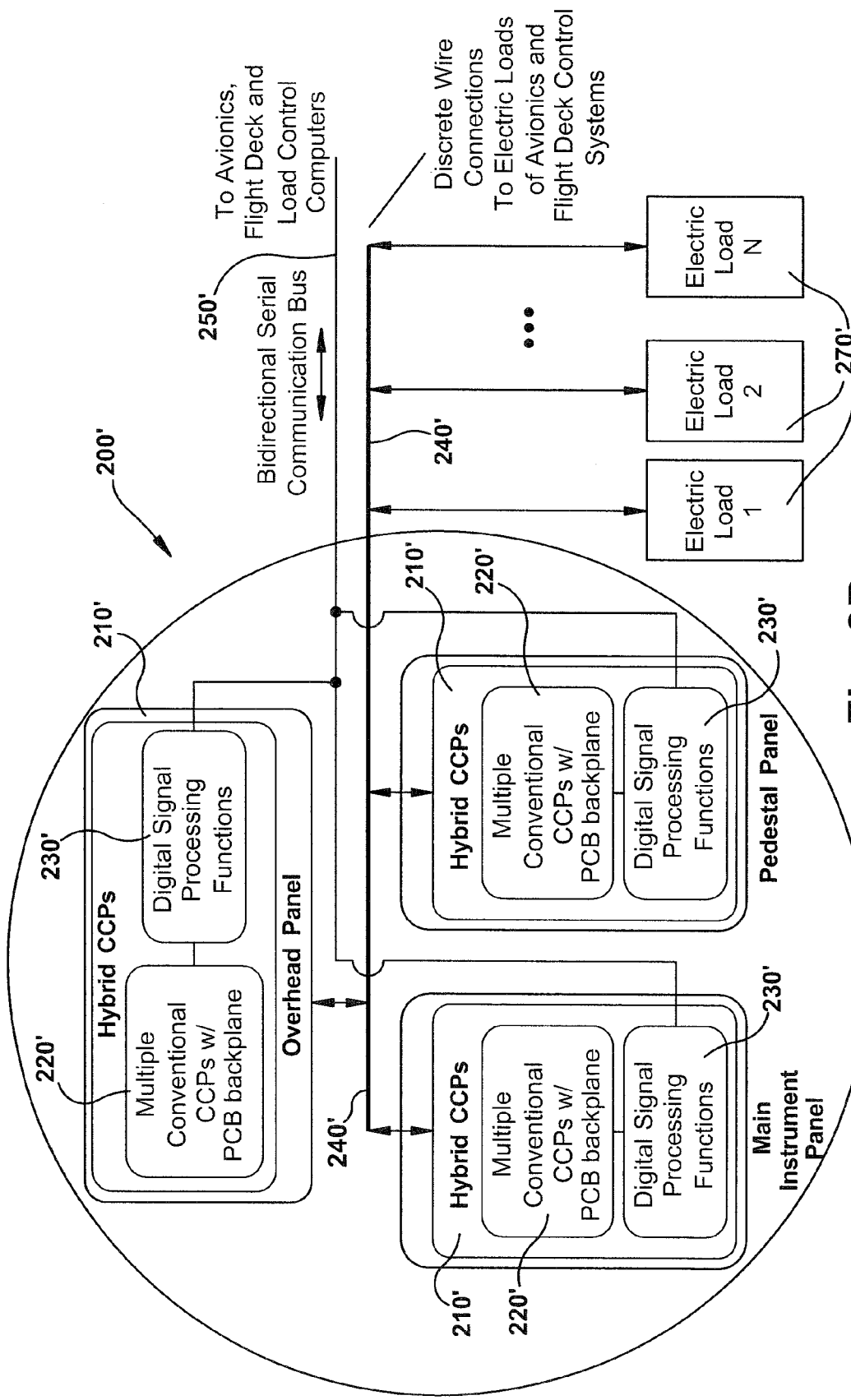

FIG. 2B illustrates an example embodiment of a detailed control panel system 200' similar to the system 200 shown in FIG. 2A. In the control panel system 200' each control panel group 210' includes a hybrid aircraft cockpit control panel that interfaces a Slimline™ control panel 220' with a digital signal processing block 230'. The Slimline™ control panel 220' couples conventional pilot operating devices through a printed circuit board backplane. The digital signal processing block 230' includes a digital signal processor (shown best in FIG. 4) and provides digital communication capabilities to the hybrid aircraft cockpit control panel. Hence, the hybrid aircraft cockpit control panel combines conventional pilot operating devices that do not provide digital output to a digital function block per the state of the art of control panel design. The digital signal processing block 230' conditions the signals from the pilot operating devices and communicates digital signals on a bidirectional serial communication bus 250' to avionics, flight deck control and load control computers. Discrete wires 240' route the output control signals from the pilot operating devices on the Slimline™ control panels 220' to one or more aircraft components 270' throughout the aircraft.

Figure 3A:
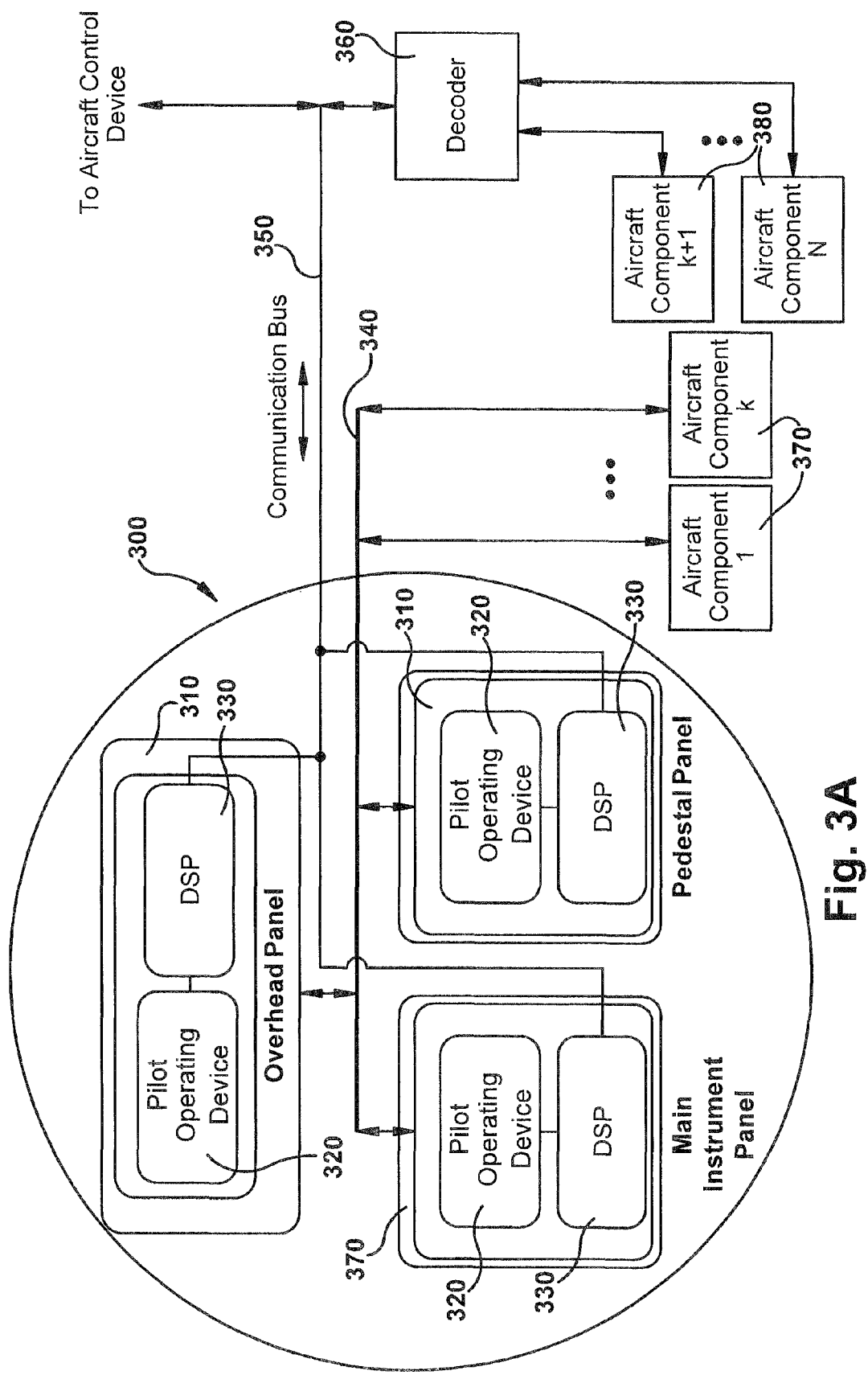
FIGS. 3A and 3B illustrate example embodiments an aircraft hybrid cockpit control panel architecture a digital signal processing block provides an integrated system monitoring and control function.

FIG. 3A illustrates another example embodiment of a hybrid aircraft cockpit control panel system 300 that includes hybrid aircraft cockpit control panels 310. Each aircraft cockpit control panel group 310 includes a panel body that houses at least one pilot operating device 320 (not shown) and a digital signal processing block 330. The digital signal processing blocks 330 transform the electrical control variable signals from the pilot operating device 320 into operating status signals indicative of a present status of the pilot operating device. To communicate the operating status signals, the hybrid aircraft cockpit control panels 310 are connected to a communication bus 350. A group of selected operating status signals are communicated on the communication bus 350 to one or more aircraft control devices (not shown), such as, for example, avionics and/or load control computers. The group of selected operating status signals communicated on the serial bus are selected in a design optimization process that improves the system's functionality and performance, improves overall system reliability and reduces weight and size, at a low cost. For example, availability of the operating status of certain pilot operating devices to the aircraft control device may streamline or otherwise enhance operation of the aircraft. Of course, all of the operating status signals may be selected for communication in some embodiments. In one example embodiment, the aircraft cockpit control panels 310 can be also connected to a bundle of wires 340 that are routed to a selected subset of the aircraft components 370 that are hardwired to some of the pilot operating devices on the aircraft cockpit control panels.

In this example embodiment, the digital signal processing blocks 330 are also configured to transform electrical control variable signals from the pilot operating devices (not shown) into digital aircraft component control signals for a subset of the aircraft components 380. The digital aircraft component control signals are communicated to the aircraft components 380 on the communication bus. In one example embodiment, a control signal decoder 360, such as, for example, a demultiplexer, is disposed between the communication bus 350 and the aircraft components 380. The decoder 360 preprocesses the aircraft component control signals and routes them to the appropriate aircraft component.

In the example embodiment shown in FIG. 3A, the digital signal processing blocks act in an integrated monitoring and control role that performs both control and monitoring operations for the cockpit control panels. The control variables set by the pilot operating devices 320 in the overhead, main, and pedestal control panels will be received and processed by the digital signal processing blocks 330. The digital signal processing blocks, in turn, send aircraft component control commands to associated aircraft components 380, via the communication bus 350 to perform the individual control functions of some or all of the aircraft components, thus reducing the weight and volume of copper control wires over the distance. In addition, the aircraft components may send aircraft component feedback signals back to the digital signal processing blocks. These feedback signals may be used provide component status on indicators on the hybrid aircraft cockpit control panel, in addition to the detailed operational information from the load devices.

In the example embodiment shown in FIG. 3A, the set of aircraft components designated 370 receive their control signals on the wire bundle 340. Aircraft components that are in close proximity to the control panel or that would not benefit extensively from enhanced communication ability, such as, for example, local lighting systems or passage signs, may be selected for this type of control arrangement. The set of aircraft components designated 380 receive their control signals by way of the communication bus 350. Aircraft components that have built in digital communication/processing capabilities or that are located relatively far away from the control panels may be suitable for this type of control arrangement.

Figure 3B:
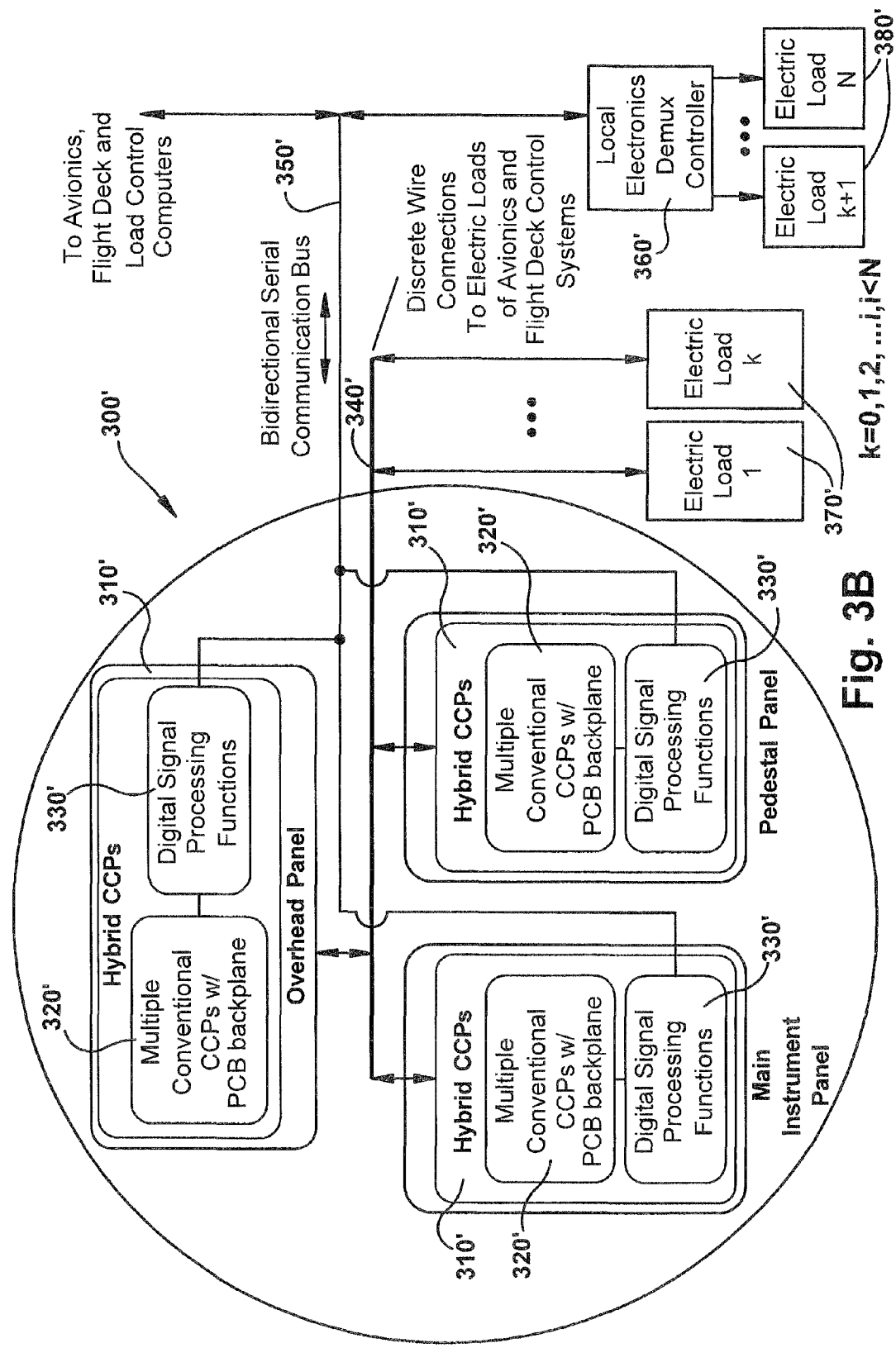

FIG. 3B further illustrates a detailed example embodiment of a control panel system 300' similar to the system 300 shown in FIG. 3A. In the control panel system 300' each control panel group 310' includes a hybrid control panel that interfaces a Slimline™ control panel 320' with a digital function block 330'. The slimline control panel 320' couples conventional pilot operating devices through a printed circuit board backplane. The digital function block 330' includes a digital signal processor (shown best in FIG. 4) and provides digital communication capabilities to the hybrid control panel. Hence, the hybrid control panel combines conventional pilot operating devices that often do not provide digital output to a digital function block. The digital function block 330' conditions the signals from the pilot operating devices and communicates digital signals on a bidirectional serial communication bus 350' to avionics, flight deck control and load control computers. Discrete wires 340' route the output control signals from the pilot operating devices on the slimline control panels 320' to one or more electric loads 370' throughout the aircraft.

In this example embodiment, the digital function blocks 330' are also configured to transform control signals from the pilot operating devices (not shown) into digital control signals for a subset of the electric loads 380'. The digital control signals are communicated to the electric loads 380' on the communication bus. In one example embodiment, a control signal decoder 360', such as, for example, a demultiplexer, is disposed between the bidirectional serial communication bus 350' and the electric loads 380'. The decoder 360' preprocesses the control signals and routes them to the appropriate aircraft component. In addition, the aircraft components may send aircraft component feedback signals back to the digital signal processing blocks. These feedback signals may be used provide component status on indicators on the hybrid aircraft cockpit control panel, in addition to the detailed operational information from the load devices.

In the example embodiment shown in FIG. 3B, the digital signal processing blocks act as integrated agents that perform both control and monitoring operations for the hybrid aircraft cockpit control panels. The control variables set by the pilot operating devices 320' will be received and processed by the digital signal processing blocks 330'. The digital signal processing blocks, in turn, send (or receive) control commands to the associated aircraft components 380', via the bidirectional serial communication bus 350' to perform the individual control functions of some or all of the aircraft components.

In the example embodiment shown in FIG. 3B, the set of aircraft components designated 370' receive their control signals on the wire bundle 340'. Aircraft components that are in close proximity to the control panel or that would not benefit extensively from enhanced communication ability, such as, for example, local lighting systems or passage signs, may be selected for this type of control arrangement. The set of aircraft components designated 380' receive their control signals by way of the bidirectional serial communication bus 350'. Aircraft components that have built in digital communication/processing capabilities or that are located relatively far away from the control panels may be suitable for this type of control arrangement.

Figure 4:
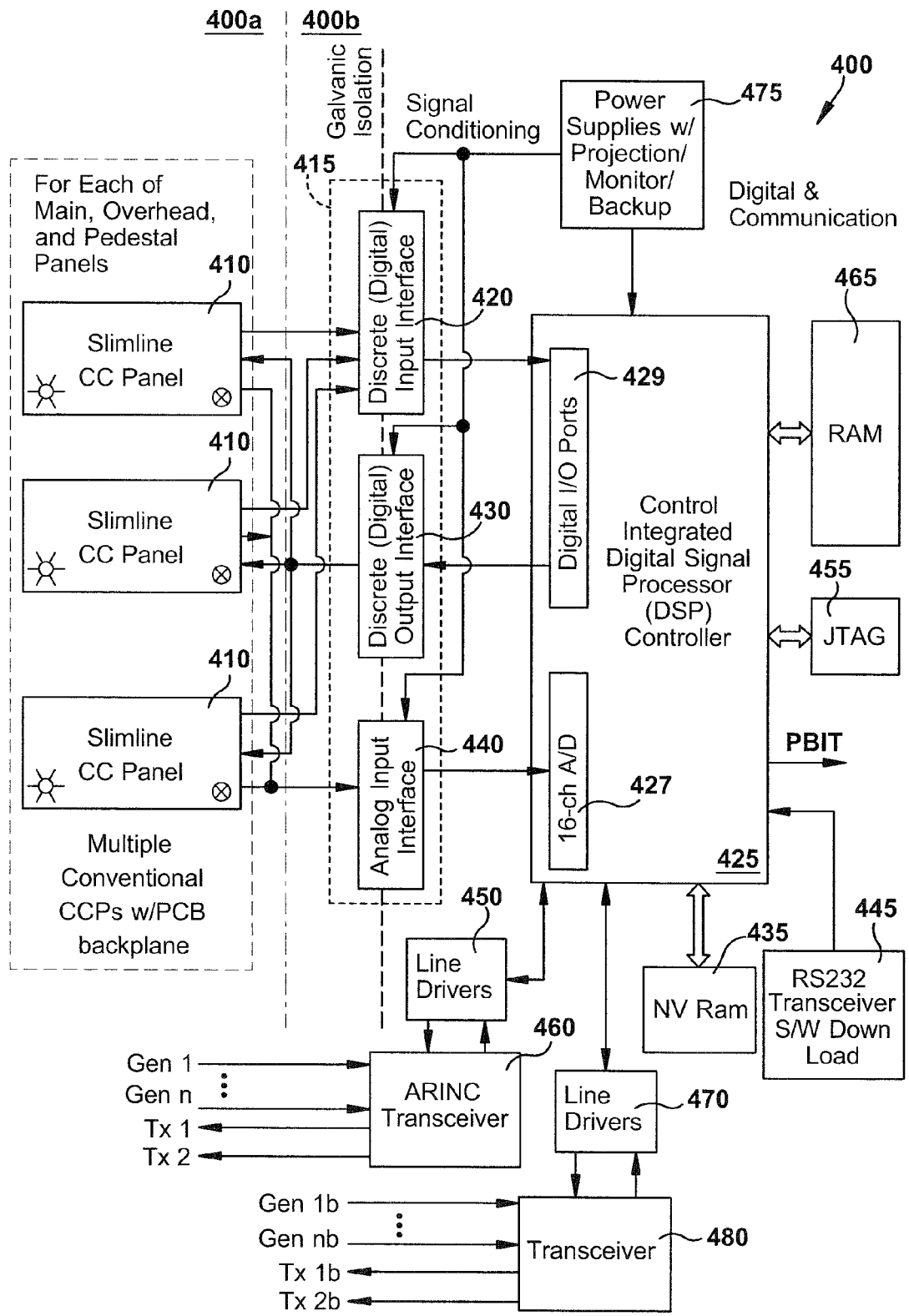
FIG. 4 illustrates an example embodiment of an aircraft hybrid cockpit control panel architecture and system block diagram.

Referring now to FIG. 4, a hybrid aircraft cockpit control panel system 400 is schematically illustrated. The hybrid aircraft cockpit control panel system includes a control panel portion 400a and a digital signal processing block 400b. The hybrid aircraft cockpit panel system 400 includes a number of aircraft cockpit control panels 410 on which pilot operating devices (not shown) are mounted and at least one control signal processor 425. As already discussed, in one example embodiment, these control panel bodies 410 include a printed circuit board that provides electrical connections for the pilot operating devices and, in some example embodiments, the control signal processor 425.

An input/output interface module 415 is disposed between the control panel bodies and the control signal processor 425. The input/output interface module 415 includes a digital input interface 420, a digital output interface 430, and an analog input interface 440. These interface components perform preprocessing on the electrical control signals passing between the pilot operating devices on the control panel bodies and the control signal processor 425. For example, the digital input interface 420 converts the discrete electrical control signals that are produced at a voltage level that is determined by the pilot operating device to a COMS/TTL level. The discrete input control signals are set by the pilot operating devices on the control panel body 410. The conditioned signals at the COMS/TTL level are, in turn, grouped and sent to the signal processor 425.

The digital output interface 430 conditions and transfers the control signal processor's output signals to corresponding circuits on the control panels 410. These output signals drive annunciation devices such as, for example, LED indicators and speakers, on the control panel bodies 410. The annunciation devices are configured to communicate status information determined by the control signal processor 425 based on signals from the aircraft components and aircraft control device.

The analog input interface 440 conditions and converts the analog control signals from the control panel bodies 410. These analog control signals are set by the corresponding pilot operating device potentiometers on the control panel. The analog input interface 440 converts the analog signals into signals that can be readily received and processed by the control signal processor. In addition, the input/output interface module 415 provides galvanic isolation between the control panel body 410 and the control signal processor 425.

The control signal processor 425 includes a bank of digital input/output ports 429 and a multi-channel analog to digital convertor 427 configured to send signals to and receive signals from the control panel body 410. A multi-channel analog to digital converter 427 having a 12-bit resolution and a conversion rate of 80 nanoseconds may be suitable for some embodiments. One digital controller that may be suitable for use as the control signal processor 425 has a 32-bit CPU running at a clock speed of more than 50 or 100 MHz. The digital controller may include on-board glue logic circuits that support digital system operations, including external memory management, serial communications, and control peripherals.

The control signal processor 425 includes an operating memory 465 and a test access port 455. In addition, the control signal processor 425 includes a non-volatile RAM 435 that stores instructions and parameters for transforming the electrical control signals from the control panel bodies 410 into status signals and digital control signals. To communicate with the communication bus, the control signal processor includes one or more transceivers 460 and 480 coupled to the control signal processor via line drivers 450, 470. As already discussed, any number of communication protocols can be used by the control signal processor. The control signal processor also includes a transceiver, such as, for example, an RS232 transceiver, that provides an auxiliary interface for peripheral devices (not shown). Peripheral devices may include a portable programming device or remote controller.

In one example embodiment, the, NVRAM 435 also functions as a start-up memory that is capable of storing a series of control signals to be transmitted to one or more aircraft components upon actuation of a given pilot operating device. This enables an aircraft operator to operate multiple aircraft components sequentially with an operation of a single pilot operating device. The start-up memory is programmed with software that includes a function list that is executed at start-up. Functions that should be performed at start-up can be added to the function list. The automatic start-up functions might include, for example, cockpit lighting, air conditioning, passage signs, windshield heating, and deicing operation.

Figure 5:
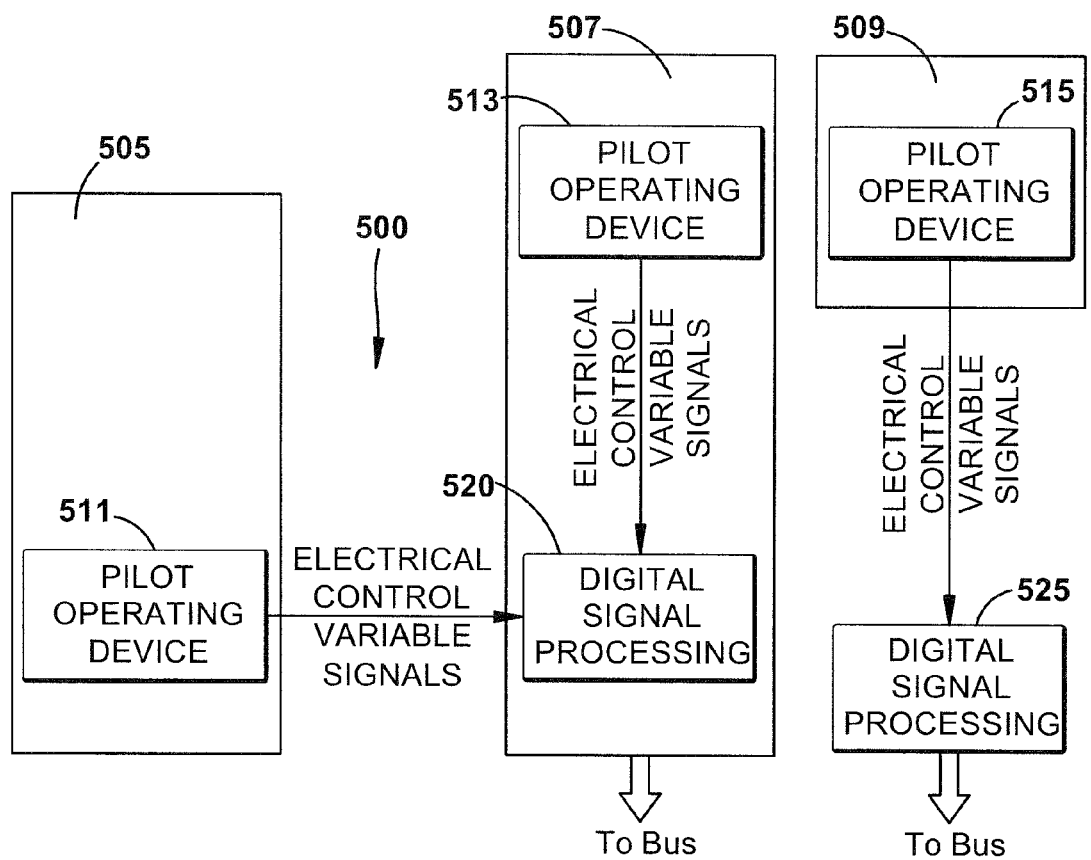
FIG. 5 illustrates an example embodiment of an aircraft hybrid cockpit control panel architecture in configurations of digital circuit distribution.

FIG. 5 illustrates a hybrid aircraft cockpit control panel system 500 that includes several hybrid aircraft cockpit control panels 505, 507, 509. The hybrid aircraft cockpit control panel 509 includes a digital signal processing block 525 that processes signals from pilot operating device 515. The digital signal processing block is mounted in a separate circuit box not physically located on the hybrid aircraft cockpit control panel 509. The hybrid aircraft cockpit control panel 505 does not have a digital signal processing block dedicated to the hybrid aircraft cockpit control panel 505 itself. Instead, a pilot operating device 511 on the hybrid aircraft cockpit control panel 505 is in signal communication with a digital signal processing block 520 that is mounted on the hybrid aircraft cockpit control panel 507. The digital signal processing block 520 thus processes signals from pilot operating devices 511, 513 on two hybrid aircraft cockpit control panels 505, 507.

Figure 6A:
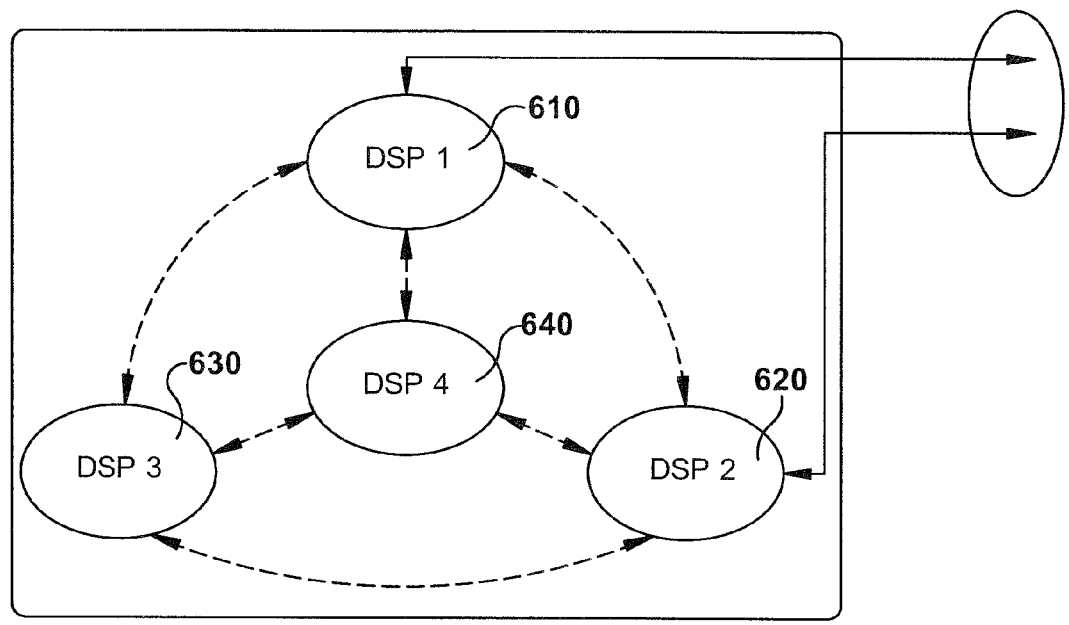
FIGS. 6A and 6B illustrate example embodiments of a system associated with networking multiple digital signal processing blocks.
Figure 6B:
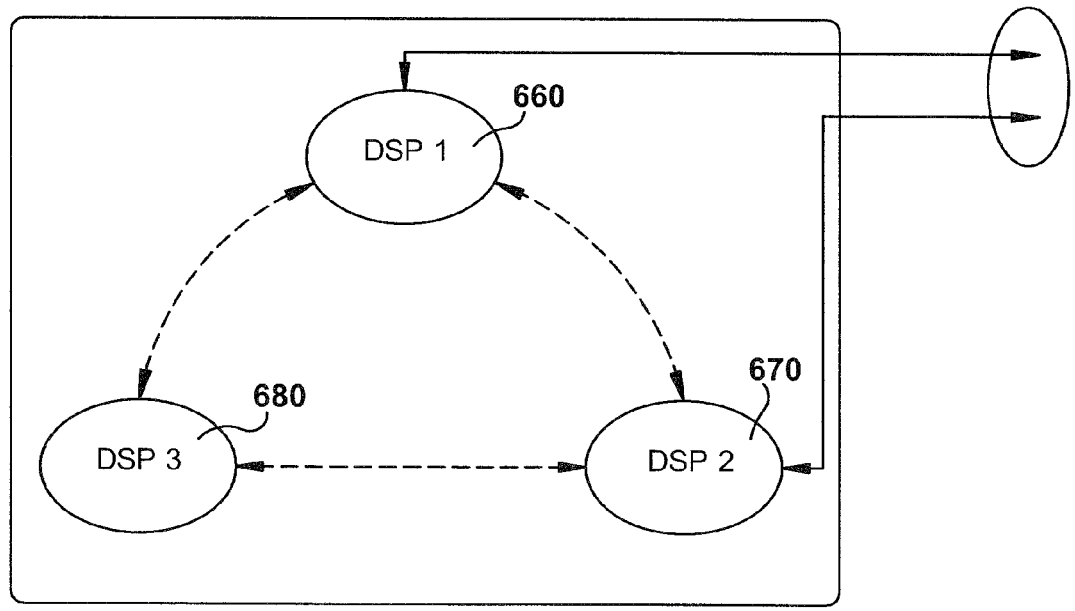

To provide digital circuit redundancy, the hybrid aircraft cockpit control panel system may include two additional duplicate digital signal processing blocks and associated circuitry that run in parallel forming a backup in the closed loop or ring configurations. FIGS. 6A and 6B illustrate redundancy schemes that interconnect the digital signal processing blocks to one another in a ring network. The ring network takes advantage of any unused processing capacity of the digital signal processing blocks by using the digital signal processing blocks associated with other hybrid aircraft cockpit control panels to perform redundant processing functions with respect to a given digital signal processing block. FIG. 6A illustrates four digital signal processing blocks 610, 620, 630, 640 connected in a four-node network ring. FIG. 6B illustrates three digital signal processing blocks 660, 670, 680 in a three-node network ring. Communication on the interconnections between the digital signal processing blocks shown in dashed lines is performed using a different communication protocol than communication on the serial communication channels shown in solid lines.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
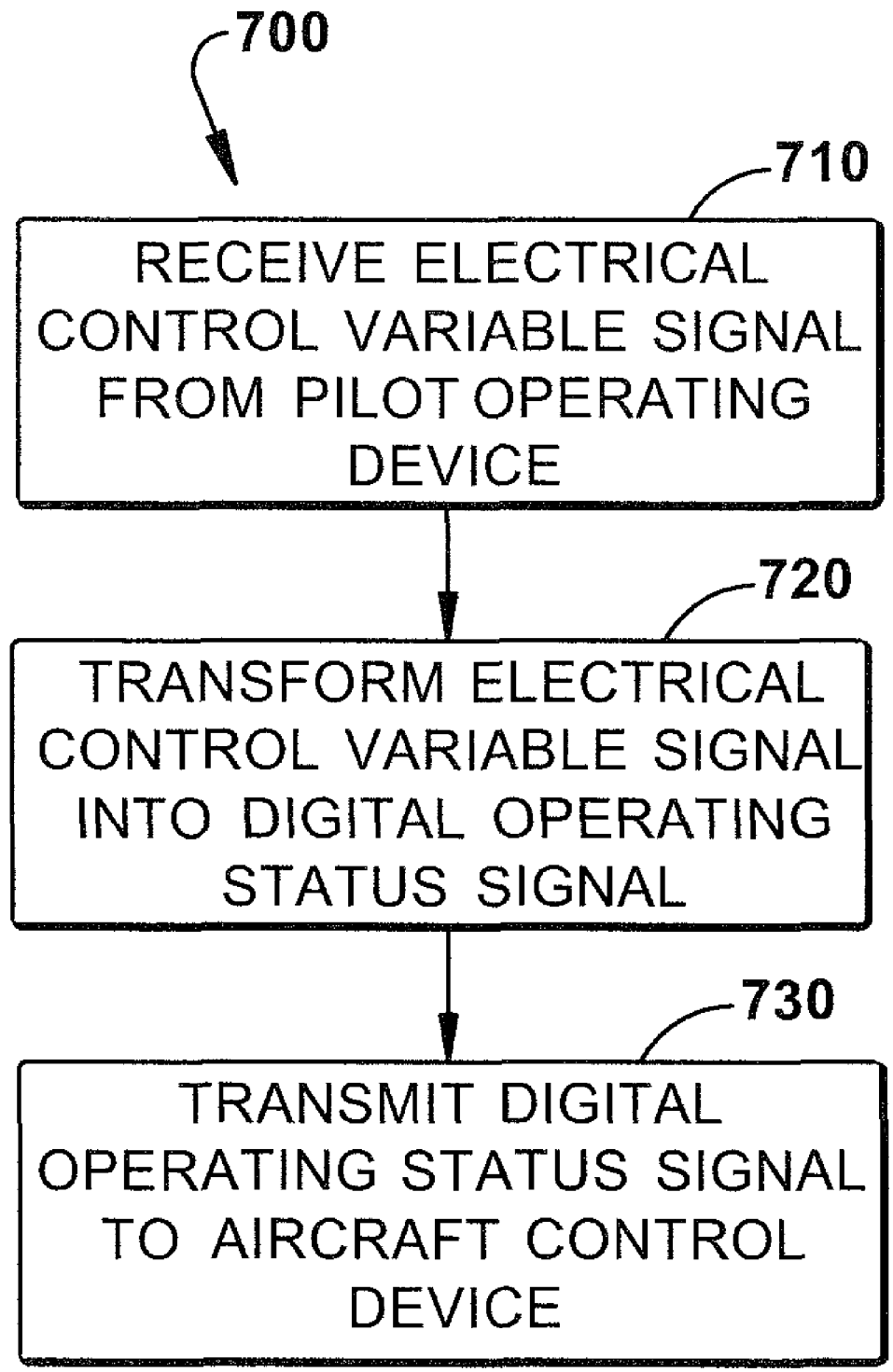
FIG. 7 illustrates an example embodiment of a method associated with an aircraft hybrid cockpit control panel.

FIG. 7 is a flowchart outlining a method 700 according to which a hybrid aircraft cockpit control panel is operated. At 710 an electrical control variable signal indicative of a control variable setting for an aircraft component is received from a pilot operating device. At 720 the electrical control variable signal is transformed into a digital operating status signal. At 730 the digital operating status signal is transmitted to an aircraft control device.

Figure 8:
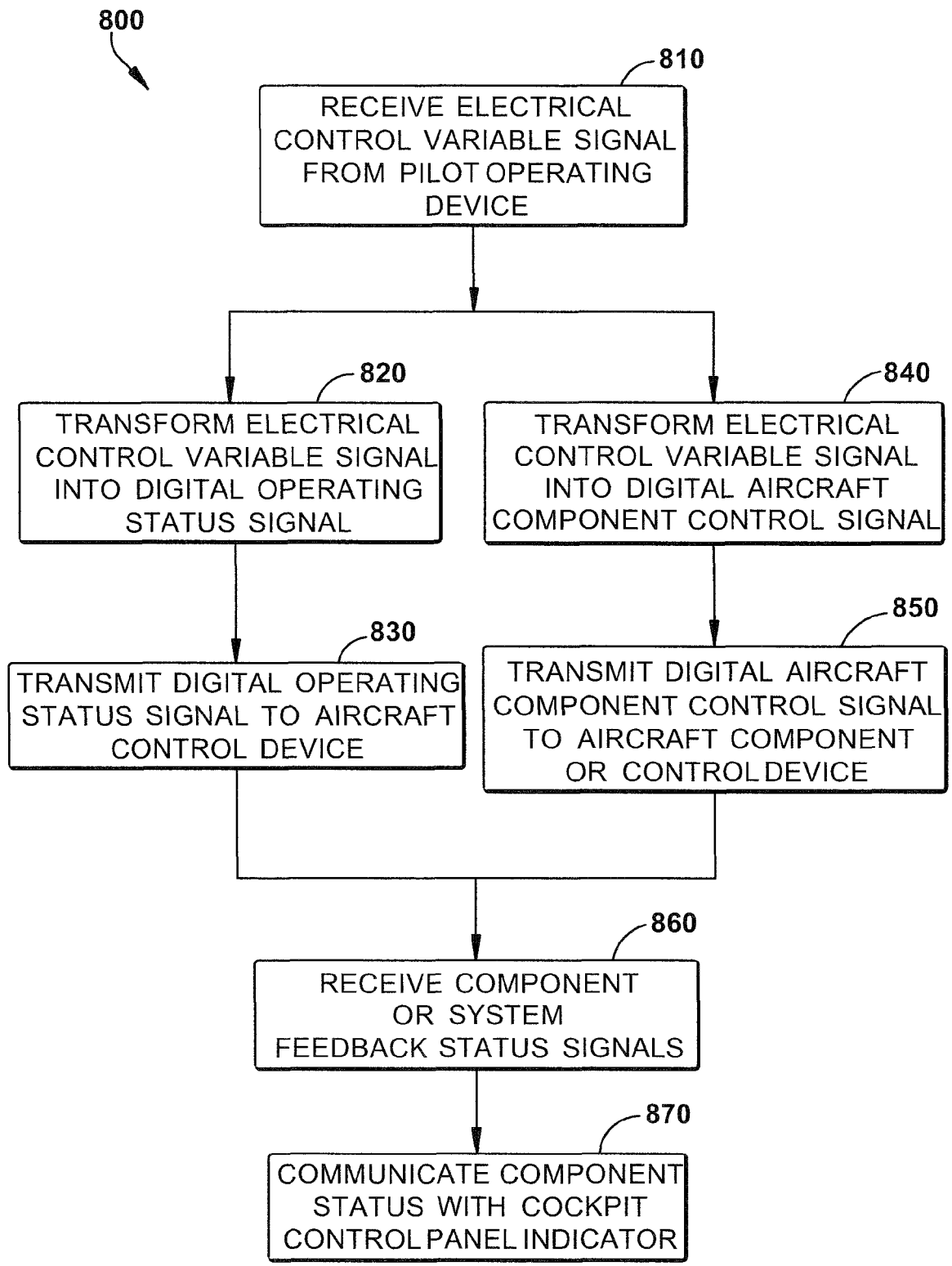
FIG. 8 illustrates an example embodiment of a method associated with an aircraft hybrid cockpit control panel.

FIG. 8 is a flowchart outlining a method 800 according to which control panel with signal processing is operated. At 810 an electrical control variable signal indicative of a control variable setting for the aircraft component is received from a pilot operating device. At 820 the electrical control variable signal is transformed into a digital operating status signal. At 830 the digital operating status signal is transmitted to an aircraft control device. At 840 the electrical control variable signal is transformed into a corresponding digital aircraft component control signal. At 850 the digital aircraft component control signal is transmitted to the aircraft component or a flight computer. At 860 aircraft component and system status feedback signals are received and at 870 the aircraft component status feedback is communicated, for example, by way of control panel indicators.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An aircraft hybrid cockpit control panel architecture comprising:
  a plurality of pilot operating devices mounted in aircraft cockpit control panels, the plurality of pilot operating devices providing electrical control variable signals configured to control a corresponding plurality of aircraft components;
  a digital signal processing block comprising an input/output interface, a digital signal processor and a digital communications circuit that receives and processes the electrical control variable signals into operating status signals; and
  where the digital signal processing block includes a serial communication bus interface configured to connect to a serial communication bus that carries a group of selected operating status signals to an aircraft control device.

2. The aircraft hybrid cockpit control panel architecture of claim 1 where the digital signal processing block also receives aircraft component status signals from the plurality of aircraft components and processes the aircraft component status signals into aircraft component feedback signals and where the serial communication bus also carries aircraft component feedback signals to the aircraft control device.

3. The aircraft hybrid cockpit control panel architecture of claim 1 comprising a plurality of wires connecting a group of selected pilot operating devices to the plurality of aircraft components, the plurality of wires carrying the electrical control variable signals from the pilot operating devices to the aircraft components.

4. The aircraft hybrid cockpit control panel architecture of claim 1 where the digital signal processing block acts in an auxiliary monitoring role.

5. The aircraft hybrid cockpit control panel architecture of claim 1 where the digital signal processing block acts in an integrated monitoring and control role.

6. The aircraft hybrid cockpit control panel architecture of claim 1 where the digital signal processing block processes the electrical control variable signals into digital aircraft component control signals and transmits the aircraft component digital control signals to the aircraft components on the serial communication bus.

7. The aircraft hybrid cockpit control panel architecture of claim 1 where the aircraft cockpit control panels include a printed circuit board that provides connections between the pilot operating devices and the digital signal processing block.

8. The aircraft hybrid cockpit control panel architecture of claim 1 where the aircraft cockpit control panels are mounted in a main cockpit control zone, an overhead cockpit control zone, and a pedestal control zone.

9. The aircraft hybrid cockpit control panel architecture of claim 1 where the input/output interface provides galvanic isolation between the digital signal processor and the pilot operating devices.

10. The aircraft hybrid cockpit control panel architecture of claim 1 where the digital signal processing block is mounted to one of the aircraft cockpit control panels.

11. The aircraft hybrid cockpit control panel architecture of claim 1 where at least one of the pilot operating devices is mounted on a first aircraft cockpit control panel and where the digital signal processing block is mounted on a second control panel.

12. The aircraft hybrid cockpit control panel architecture of claim 1 where the digital signal processing block is housed in a circuit box that is separate from the aircraft cockpit control panels.

13. The aircraft hybrid cockpit control panel architecture of claim 1 where the digital signal processing block comprises a start-up memory configured to store a sequence of aircraft component control instructions to be transmitted to one or more aircraft components upon actuation of at least one of the pilot operating devices.

14. The aircraft hybrid cockpit control panel architecture of claim 1 comprising at least two digital signal processing blocks that are placed in signal communication with one another to form a network and where signals from each digital signal processing block are routed through the network to provide a redundant signal path to the serial communication bus for each of the digital signal processing blocks.

15. The aircraft hybrid cockpit control panel architecture of claim 1 comprising at least three digital signal processing blocks that are placed in signal communication with one another to form a network ring that forms a dual-redundant serial communication channel to provide a redundant digital control path to the serial communication bus for each of the digital signal processing blocks.

16. A method that processes signals from an aircraft cockpit control panel, comprising:
from a pilot operating device on a hybrid aircraft cockpit control panel, receiving an electrical control variable signal indicative of a control variable setting for an aircraft component;
transforming the electrical control variable signal into a digital operating status signal indicative of a present status of the pilot operating device; and
transmitting the digital operating status signal to an aircraft control device.

17. The method of claim 16 further comprising:
receiving aircraft component status signals from one or more aircraft components;
communicating an aircraft component status based at least in part on the aircraft component status signals by way of an indicator on the hybrid aircraft cockpit control panel.

18. The method of claim 16 where the electrical control variable signal is transformed with a first digital signal processing block associated with the hybrid aircraft cockpit control panel and further where the digital operating status signal from the first digital signal processing block are also transmitted to a second digital signal processing block and where the second digital signal processing block transmits the digital operating status signals to the aircraft control device.

19. The method of claim 16 further comprising transforming the electrical control variable signal into a digital aircraft component control signal and transmitting the digital aircraft component control signal to the aircraft component.

20. The method of claim 16 comprising storing a sequence of aircraft component control instructions to be transmitted to and executed by one or more aircraft components upon actuation of the pilot operating device.

\* \* \* \* \*